United States Patent [19]

Ohtsubo

[11] Patent Number: 4,939,780
[45] Date of Patent: Jul. 3, 1990

[54] CATV CONVERTER

[75] Inventor: Katsuyuki Ohtsubo, Soma, Japan

[73] Assignee: Alps Electric Co., Ltd., Tokyo, Japan

[21] Appl. No.: 187,264

[22] Filed: Apr. 28, 1988

[30] Foreign Application Priority Data

Aug. 18, 1987 [JP] Japan .................................. 62-204841

[51] Int. Cl.⁵ ............................................... H04N 7/16
[52] U.S. Cl. .......................................... 380/10; 380/7; 380/19
[58] Field of Search ...................... 380/7, 9, 10, 19, 14, 380/15, 20; 358/174, 188, 189, 198

[56] References Cited

U.S. PATENT DOCUMENTS

| | | | |
|---|---|---|---|
| 3,144,512 | 8/1964 | McAllan et al. | 358/188 X |
| 3,946,338 | 3/1976 | Schmidt | 358/188 X |
| 4,470,071 | 9/1984 | Rindal | 358/198 |
| 4,670,904 | 6/1987 | Rumreich | 380/15 |
| 4,706,285 | 11/1987 | Rumreich | 380/14 |
| 4,718,086 | 1/1988 | Rumreich et al. | 380/20 |

Primary Examiner—Stephen C. Buczinski
Assistant Examiner—Bernarr E. Gregory
Attorney, Agent, or Firm—Guy W. Shoup; Norman R. Klivans

[57] ABSTRACT

A CATV converter having a filter for extracting a voice intermediate frequency signal superposed with a data signal necessary to descramble a scrambled television signal by AM modulation, a synchronous detector responsive to the extracted voice intermediate frequency signal for detecting the data signal, a tank circuit for tuning with the carrier to apply the carrier of the voice intermediate frequency signal to the synchronous detector, and a voice detector for producing the voice intermediate frequency signal from the tank circuit to input it thereto. Thus, the converter can separately produce a data signal and a voice signal at a preferable S/N ratio with a simple configuration.

6 Claims, 2 Drawing Sheets

CATV CONVERTER

BACKGROUND OF THE INVENTION

FIELD OF THE INVENTION

This invention relates to a CATV converter adapted to separate a data signal necessary to descramble a scrambled television signal and a voice signal at a preferable S/N ratio with a simple configuration to produce both the signals.

DESCRIPTION OF THE PRIOR ART

A CATV broadcasting is provided for specific subscribers through a wire transmission different from an ordinary television broadcasting transmitted through a radio transmitter. The subscriber converts the CATV broadcasting transmitted from a broadcasting station to the frequency of a vacant channel of an ordinary television broadcasting channel by means of a CATV converter, and receives it by the ordinary television receiver.

The CATV broadcasting gives subscriber's codes and program contract codes to the individual subscribers so as to specify the subscribers, and transmits the codes together with the television signal from the transmitter to control and serve the individual subscribers.

There is a scrambling broadcasting of a charged program as one of the controls. This is a system that even the subscriber of the CATV who has not yet contracted cannot ordinarily receive the charged program different from the no charge service program.

There is as one of such scrambling broadcasting methods a transmission in which a television signal is scrambled to be transmitted by suppressing the synchronizing signal section of the television signal by the transmitter, and a data signal necessary to decode it is superposed on a voice carrier together with the subscriber's code and the program contract code to be transmitted. In this case, the CATV converter of the contracted subscriber can decode the synchronizing signal section according to the data signal to descramble the television signal, thereby receiving the normal video. However, the CATV converter of the uncontracted subscriber cannot descramble it, and cannot synchronize the received video in disorder, thereby disabling to normally receive the video.

FIG. 2 is a block circuit diagram showing a conventional CATV converter in which a data signal necessary to descramble a voice signal is separated by a split carrier system from a voice intermediate frequency signal to be decoded.

In FIG. 2, an intermediate frequency signal outputted from a tuner, not shown, is applied to a SAW filter 1, and only a voice intermediate frequency signal is extracted. The voice intermediate frequency signal is branched by a branch unit 2 to the signals for an AM modulation system and an FM modulation system, one of which is applied to an amplifier 4 of a data signal detecting IC 3, and the other of which is applied to a voice intermediate frequency amplifier 5. The voice intermediate frequency signal applied to the amplifier 4 is suitably amplified by an AGC control to be applied to a synchronous detector 6 and a carrier limiter 7. In the carrier limiter 7 is provided a tank circuit 8 for tuning with the voice intermediate carrier (e.g., 41.25 MHz) of the voice intermediate frequency signal to output the voice intermediate carrier to the synchronous detector 6. The synchronous detector 6 demodulates and outputs the data signal superposed with the voice intermediate signal by AM modulation by means of the synchronous detection according to the carrier, and applies an AGC signal to the amplifier 4. The amplifier 4, the synchronous detector 6 ad the carrier limiter 7 are contained in the data signal detecting IC 3, and attached with the tank circuit 8 thereto.

Further, the voice intermediate frequency signal applied to the voice intermediate frequency amplifier 5 is suitably amplified, further detected by the voice detector 9, and the voice signal superposed by the FM modulation is demodulated and outputted.

In the conventional CATV converter of such a configuration, the voice intermediate frequency signal is largely attenuated by the SAW filter 1 and the branch unit 2. Thus, the voice intermediate frequency amplifier 5 must be provided at the previous stage of the voice detector 9 of the FM modulation system, the AGC controller is also required in the voice intermediate frequency amplifier 5, the circuit configuration is complicated that much, and the converter has problems that it thus becomes expensive and cannot be reduced in size. Further, the converter also has problems that the S/N ratio of the data signal is wrong due to the detection of the data signal from the voice intermediate frequency signal attenuated by the SAW filter 1 and the branch unit 2. Moreover, the output of the SAW filter 1 is ordinarily outputted in balance, and the branch units 2 connected to the filter must input the signal in balance. However, when the branch units 2 input the signal in balanced, the configuration is complicated to be expensive. Then, the output of the SAW filter 1 is forcibly outputted in unbalance to use simple branch units 2. Thus, the converter has another problem that the common noise of the SAW filter 1 is large.

SUMMARY OF THE INVENTION

Accordingly, an object of this invention is to provide a CATV converter which can eliminate the above-mentioned drawbacks of the conventional CATV converter and which can separately produce a data signal and a voice signal at a preferable S/N ratio with a simple configuration.

In order to eliminate the above-mentioned drawbacks, there is provided a CATV converter comprising a filter for extracting a voice intermediate frequency signal superposed with a data signal necessary to descramble a scrambled television signal by AM modulation, a synchronous detector responsive to the extracted voice intermediate frequency signal for detecting the data signal, a tank circuit for tuning with the carrier to apply the carrier of the voice intermediate frequency signal to the synchronous detector, and a voice detector for producing the voice intermediate frequency signal from the tank circuit to input it thereto.

According to the invention, the tank circuit is tuned with the carrier to apply the carrier of the voice intermediate frequency signal to the synchronous detector, the voice intermediate frequency signal is produced from the tank circuit and inputted to the voice detector. Thus, a branch unit for branching the voice intermediate frequency signal to the signals for AM modulation system and FM modulation system in the conventional CATV converter of this type can be eliminated. Therefore, the voice intermediate frequency signal is synchronously detected by the synchronous detector without attenuation with the branch. Since the branch unit is not provided, the voice intermediate frequency signal extracted by the filter can be handled as in balance. Further; when the voice intermediate frequency signal applied to the synchronous detector is AGC-controlled, the voice intermediate frequency signal produced from the tank circuit and inputted to the voice detector is not necessarily AGC-controlled.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

An embodiment of the present invention will be described in detail with reference to FIG. 1.

Figure 1:
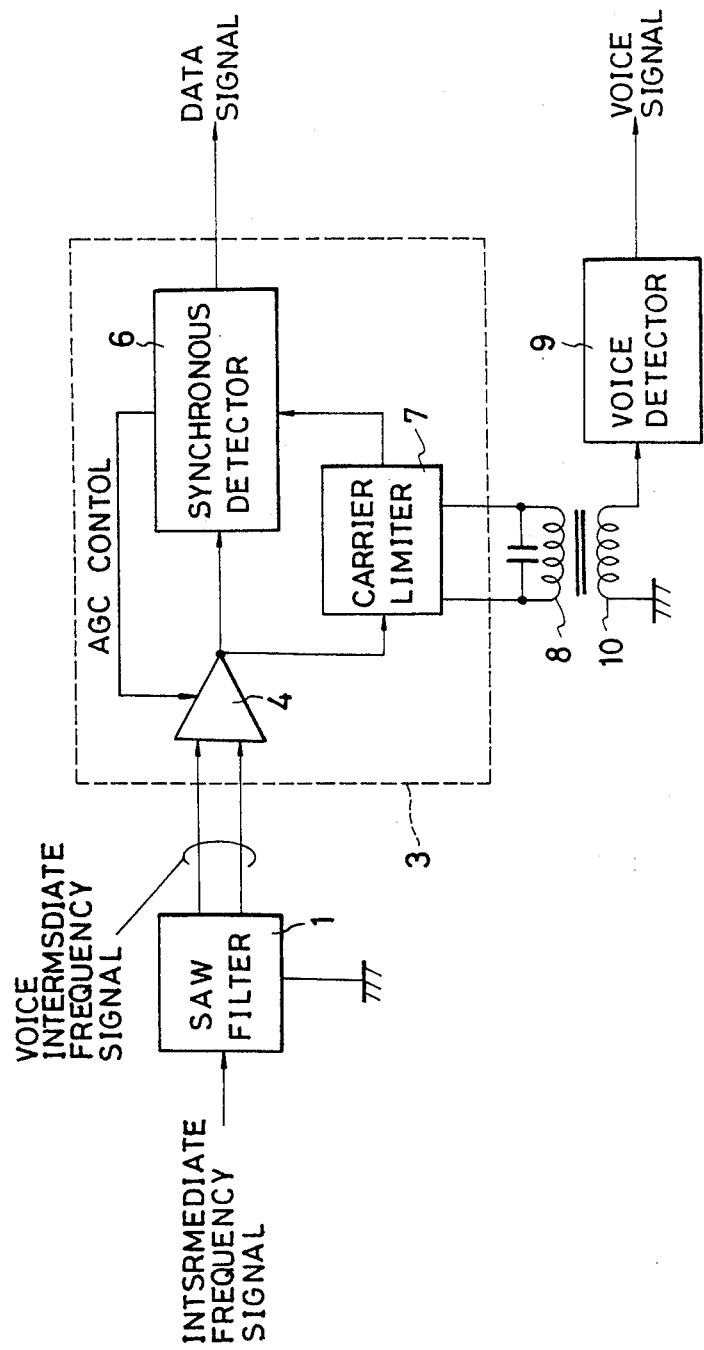
FIG. 1 is a block circuit diagram of a CATV converter of the present invention in which a voice signal and a data signal necessary to descramble are separately demodulated by a split carrier system from a voice intermediate frequency signal.

FIG. 1 is a block circuit diagram showing a CATV converter of the present invention in which a voice signal and a data signal necessary to descramble the signal are separately demodulated by a split carrier system from a voice intermediate frequency signal. In FIG. 1, the reference numerals as those in FIG. 2 designate the same or equivalent components, and a detailed description thereof will be omitted.

Figure 2:
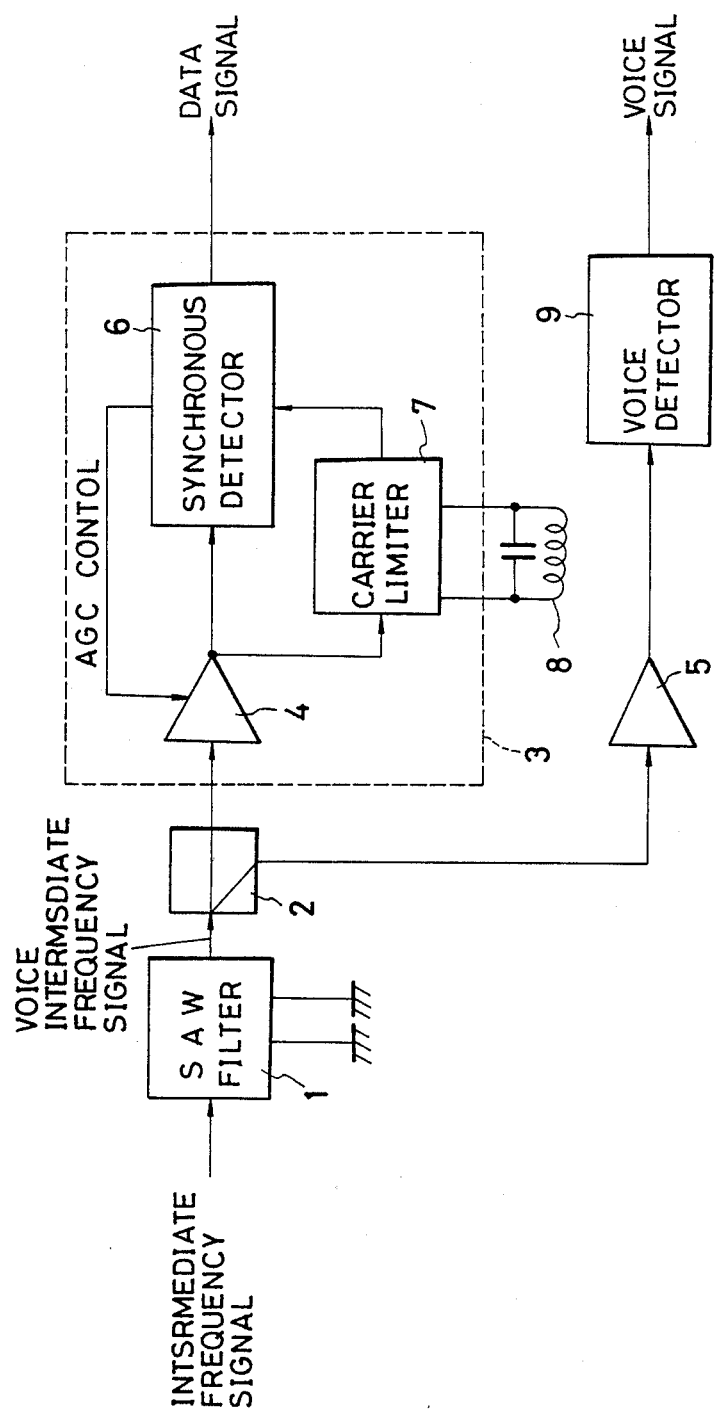
FIG. 2 is a block circuit diagram of a conventional CATV converter in which a voice signal and a data signal necessary to descramble the signal are separately demodulated from a voice intermediate frequency signal by a split carrier system.

In FIG. 1, the difference from the CATV converter in FIG. 2 is that a voice intermediate frequency signal extracted from a SAW filter 1 is applied directly to an amplifier 4 of a data signal detecting IC 3 as in balance, an electromagnetic coupler 10 electromagnetically coupled with a secondary coil is provided at the coil of a tank circuit 8, one end of the secondary coil is grounded, and the voice intermediate frequency signal is applied from the other end of the secondary coil to a voice detector 9.

In the constitution described above, the voice intermediate frequency signal extracted by the SAW filter 1 is applied to the amplifier 4 without attenuating by the branch unit 2 as the conventional CATV converter. Thus, the amplification factor of the amplifier 4 may be small that much, and the S/N ratio of the data signal synchronously detected, demodulated and outputted by a synchronous detector 6 is improved. Since the output of the SAW filter 1 is applied to the amplifier 4 as in balanced, it is not necessary to forcibly output from the SAW filter 1 in unbalance as the conventional CATV converter, and the common noise of the SAW filter 1 is not increased that much. Further, the voice intermediate frequency signal produced by the electromagnetic coupler 10 from the tank circuit 10 is already suitably amplified by the amplifier 4, and a voice intermediate frequency amplifier 5 is not necessary at the previous stage of the voice detector 9 as in the conventional CATV converter. Moreover, the voice intermediate frequency signal produced from the tank circuit 8 is uniform level under the AGC control by the amplifier 4, and it is not as well necessary to provide an AGC controller separately.

In the embodiment described above, the SAW filter 1 is used as a filter for extracting the voice intermediate frequency signal. However, the present invention is not limited to the particular embodiment. For example, a filter of other configuration may be also employed. Further, in the embodiment described above, the voice intermediate frequency signal is produced by electromagnetic coupling from the tank circuit 8. However, the voice intermediate frequency signal may also be produced by capacitive coupling.

According to the embodiment of the CATV converter of the present invention as described above, the branch unit for branching the voice intermediate frequency signal to signals for an AM modulation system and an FM modulation system is unnecessary, and the voice intermediate frequency amplifier is not needed in the previous stage of the voice detector. Therefore, the circuit configuration of the CATV converter is simplified in small size inexpensively. Since the voice intermediate frequency signal is synchronously detected by the synchronous detector without attenuating it by the branch, the data signal can be demodulated and outputted with preferable S/N ratio.

What is claimed is:

1. A descrambler comprising:
    a filter for extracting a voice intermediate frequency signal superposed with a data signal from the intermediate frequency signal,
    a synchronous detector responsive to the extracted voice intermediate frequency signal for detecting the data signal,
    a carrier limiter for tuning with a carrier of the voice intermediate frequency signal, to apply the carrier to the synchronous detector, and a voice detector for detecting the voice signal from an output of the carrier limiter.

2. A descrambler according to claim 1, wherein the voice intermediate frequency signal extracted by said filter is inputted to said synchronous detector in balance.

3. A descrambler according to any of claims 1 and 2, wherein the voice intermediate frequency signal is provided from said carrier limiter to said voice detector by an electromagnetic coupler.

4. A descrambler according to claim 2, further comprising means for balancing the extracted voice intermediate signal provided to the synchronous detector.

5. A descrambler according to any of claim 1 and 4, further comprising an electromagnetic coupler electrically connected between said carrier limiter and said voice detector for providing the voice intermediate frequency signal to the voice detector.

6. A descrambler according to claim 1, wherein the carrier limiter includes a tank circuit for tuning with the carrier of the voice intermediate signal frequency, and wherein the tank circuit provides the output of the carrier limiter to the voice detector.

* * * * *

UNITED STATES PATENT AND TRADEMARK OFFICE
CERTIFICATE OF CORRECTION

PATENT NO. : 4,939,780

DATED : July 3, 1990

INVENTOR(S) : Katsuyuki Ohtsubo

It is certified that error appears in the above-identified patent and that said Letters Patent is hereby corrected as shown below:

Col. 4, Line 54

"claim" should read --claims--

Signed and Sealed this

Seventeenth Day of September, 1991

Attest:

HARRY F. MANBECK, JR.

Attesting Officer

Commissioner of Patents and Trademarks